United States Patent [19]

Austin

[11] Patent Number: 5,309,139
[45] Date of Patent: May 3, 1994

[54] VEHICLE MONITORING SYSTEM

[76] Inventor: Charles W. Austin, 751 Quail Dr., Punta Gorda, Fla. 33982

[21] Appl. No.: 908,342

[22] Filed: Jul. 6, 1992

Related U.S. Application Data

[63] Continuation of Ser. No. 562,334, Aug. 3, 1990, abandoned.

[51] Int. Cl.⁵ .............................................. B60Q 9/00
[52] U.S. Cl. .................... 340/462; 340/438; 340/439; 340/441; 340/459; 340/461; 364/424.04
[58] Field of Search ............... 340/438, 439, 441, 459, 340/461, 462; 364/424.04, 431.03

[56] References Cited

U.S. PATENT DOCUMENTS

| | | | |
|---|---|---|---|
| 4,611,193 | 9/1986 | Bruggemann | 340/461 |
| 4,623,870 | 11/1986 | Irimajiri et al. | 340/461 |
| 4,636,782 | 1/1987 | Nakamura et al. | 340/461 |
| 4,647,901 | 3/1987 | Teshima et al. | 340/461 |
| 4,888,577 | 12/1989 | Dunkley et al. | 340/462 |
| 5,006,829 | 4/1991 | Miyamoto et al. | 340/459 |
| 5,017,916 | 5/1991 | Londt et al. | 340/439 |

FOREIGN PATENT DOCUMENTS

| | | | |
|---|---|---|---|
| 58-123425 | 7/1983 | Japan | 340/461 |
| 59-196927 | 11/1984 | Japan | 340/439 |

Primary Examiner—John K. Peng
Assistant Examiner—Edward Lefkowitz
Attorney, Agent, or Firm—Frank A. Lukasik

[57] ABSTRACT

The invention is a novel system for monitoring a plurality of functions and conditions of a vehicle and providing a graphic presentation and recordation of torque and horsepower as well as other factors contributing to or depreciating a vehicle's performance as well as concurrently displaying manufacturers established parameters for on-board, live comparison of actual performance with expected design performance. Externally visible components of a display panel includes a group of separate analog and digital signal visual display means for indicating the approximate value of the operating parameters. All information is reported live and updated by the on-board computer. When the vehicle's accelerator is fully opened, a switch is engaged, and if other necessary conditions are met, the torque corresponding to the RPM is plotted concurrently with the manufacturers established parameters and remains graphically presented on the screen until cleared.

2 Claims, 17 Drawing Sheets

VEHICLE MONITORING SYSTEM

CROSS REFERENCE TO RELATED APPLICATION

This application is a continuation of my prior application Ser. No. 07/562,334, filed Aug. 3, 1990, now abandoned.

BACKGROUND OF THE INVENTION

1. Field of the Invention

This invention relates generally to the vehicle monitoring arts and more particularly to a novel modular system for monitoring a plurality of functions and conditions of a vehicle and providing a graphic presentation of Manufacturer Established parameters (MFE) and recordation of torque and horsepower as well as other factors contributing to or depreciating a vehicle's performance.

2. Discussion of the Prior Art

Automobile manufacturers are constantly searching for means to improve their vehicles and for ways to prove that their vehicles are superior to their competitors. Also, drivers have reached a new level of sophistication, knowledge, experience, and understanding and are eager to go beyond existing performance reporting barriers and limitations. Drivers want to know how their vehicles perform, not only on a test track, but in day-to-day operations, under various loads, both internal and external, on the terrains they traverse and under the weather conditions they encounter. As drivers/owners are permitted the luxury of seeing performance and deteriorations of performance of their vehicles, they will be more likely to take corrective maintenance action. Today's drivers are eager to maintain the efficiency of their vehicles and are becoming conscious that a properly operating vehicle emits fewer pollutants and impacts the environment far less than otherwise.

In general, the fuel consumption of the motor vehicle varies to a considerable extent depending on not only the fuel consumption performance of an engine but also the driving manner of a driver. One prior art device uses a so-called economy meter for indicating an engine load by the intake vacuum, and a drive computer for calculating a fuel consumption per unit running distance or the like. Another prior art device, as shown in U.S. Pat. No. 4,622,637 to Tomita et al provides an optimum shift timing indicating device for a vehicle, capable of giving a driver information regarding the optimum shift timing, taking into consideration of the fuel consumption performance and the running performance by the use of a small memory capacity, so that the fuel consumption can be effectively decreased.

Other prior art devices for monitoring vehicular performance may be found in U.S. Pat. Nos.: 3,906,437 to Brandwein et al; 4,551,801 to Sokol; and 4,611,193 to Bruggemann. U.S. Pat. No. 3,906,437 discloses a "dynamic system" and claims refer to such integrated assemblages of machinery or material processing equipment. Such dynamic systems share in common the characteristic of having a large number of operating parameters, such as, temperatures, fluid flow rates, voltages and the like, the magnitude of which must be continuously monitored to successfully control the operation of the system. A dynamic system monitoring device is provided with a plurality of sensors each one of which is adapted to measure the magnitude of a specific operating parameter of the system and to generate a sensor signal voltage that varies directly with the magnitude of the operating parameter being measured. The sensor signal voltage from each sensor is "conditioned" and the conditioned signal voltage is transmitted to analog signal display means which display in analog form the approximate value of all the operating parameters being measured. The conditioned signal voltage is also optionally transmitted to an array of alpha-numeric units which display in numeric form the precise value of the operating parameter being measured. Each of the outputs are displayed individually and do not react with each other nor do they provide a combined output.

The shift timing indicating device disclosed in U.S. Pat. No. 4,622,637 includes a speed sensor for detecting a rotational speed of an engine or a running speed of the vehicle, a load sensor for detecting an engine load, a data processing device having a data map having a set shift-up region and/or shift-down region for emitting a shift-up or shift-down instruction signal so that instruction about the optimum shift timing can be given to the driver with the use of only a small memory capacity.

U.S. Pat. No. 4,551,801 discloses a monitoring module for monitoring a plurality of functions and conditions of a vehicle including a plurality of sensors for producing sensor signals in response to a plurality of vehicle functions and conditions. The module includes processing means responsive to the sensor signals from the input means for producing display signals corresponding to the values of the associated functions and conditions. The processing means is responsive to the sensor identifying input signals for selecting from the memory means data and instructions for response to the particular sensors coupled to the input means. Each of the sensors and their corresponding processing means are displayed individually and do not react with each other nor do they provide a combined output.

SUMMARY OF THE INVENTION

The present invention has been developed to obviate the above described disadvantages of the prior art by including all of the various vehicle operating conditions sensed and displayed by the prior art and in addition, to provide an on-board dynamometer displaying manufacturer established parameters.

Accordingly, it is an object of the present invention to provide a device capable of providing a driver with information to monitor factors influencing, contributing or effecting a vehicle and/or engine's performance.

It is another object of the present invention to provide a vehicle monitoring system which provides a graphic representation of torque and horsepower, and manufacturer established parameters as well as other parameters.

It is still another object of the present invention to provide a system for monitoring a plurality of functions and conditions of a vehicle and providing a graphic presentation of torque and horsepower as well as other factors contributing to or depreciating a vehicle's performance.

These and other objects of the invention will become apparent to those skilled in the art to which the invention pertains when taken in light of the annexed drawings.

DESCRIPTION OF THE PREFERRED EMBODIMENT OF THE INVENTION

Figure 1:
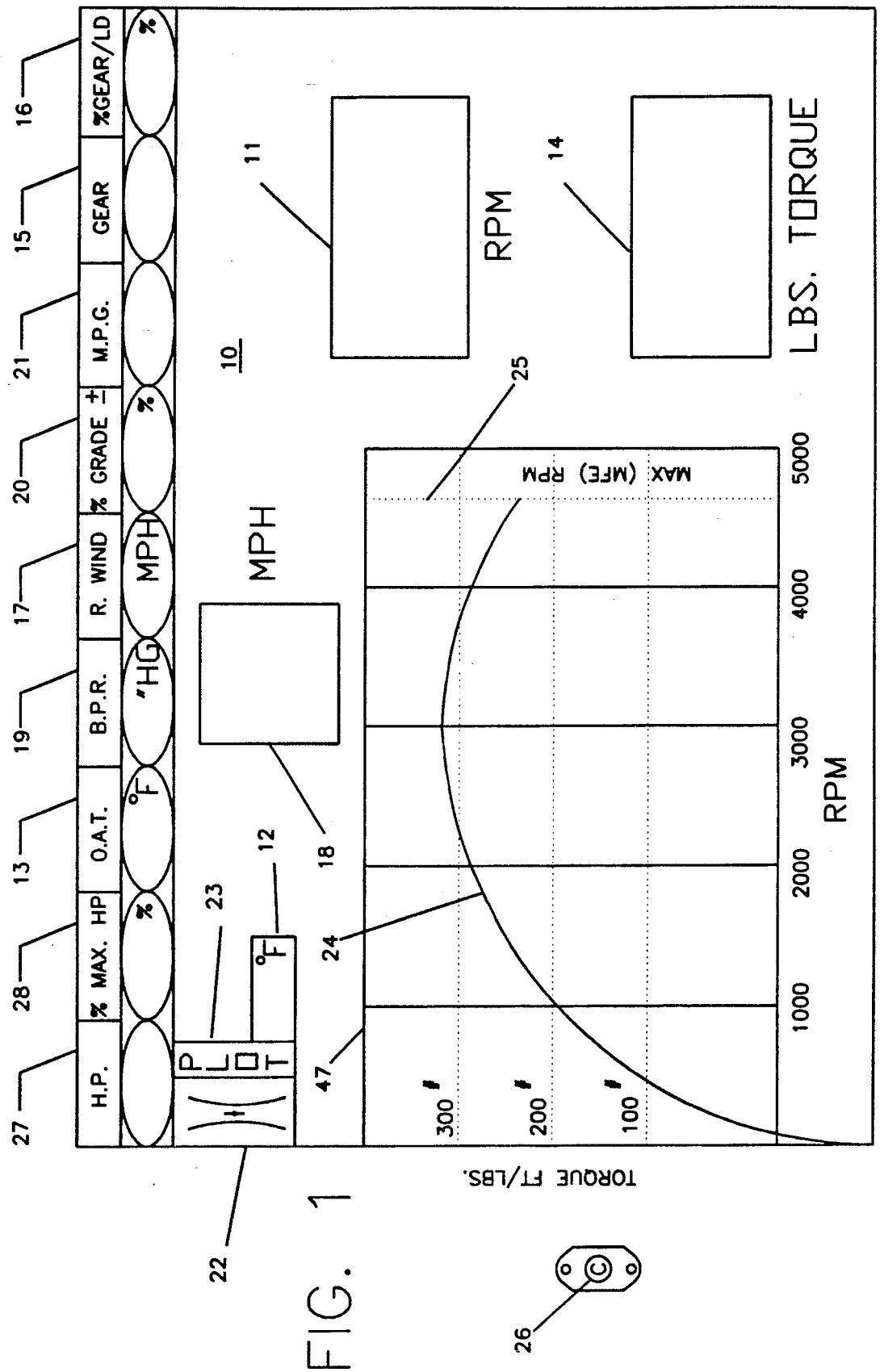
FIG. 1 is a front view of the visual display of the monitoring system.
Figure 2:
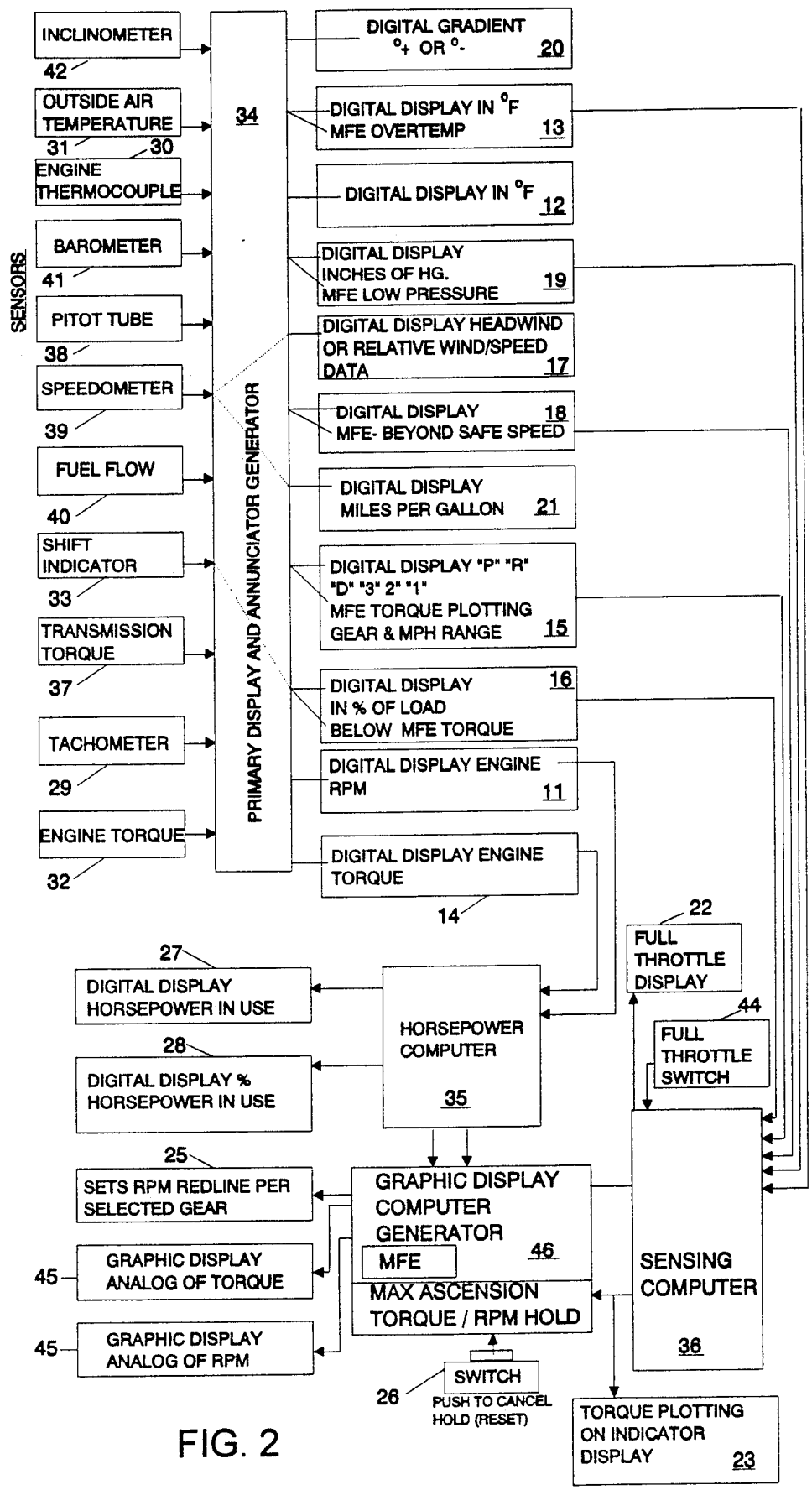
FIG. 2 is a block diagram showing the arrangement of the digital processing circuit used in the above embodiment.

Referring now in more detail to the drawings, FIG. 1, the visual display panel, illustrated and generally designated by the reference numeral 10, is designed to fit in a standard instrument opening in a dashboard of a vehicle. The externally visible components of the panel 10 include a group of separate analog and digital signal visual display means for visually indicating the approximate value of the operating parameters. All displays, including the bar graphs, may be developed with liquid crystals although other display devices such as light emitting diodes, liquid crystals of the light reflective or light transmissive type, fiber optic readouts, and incandescent readouts all of which are available from commercial electronic suppliers are possible.

In order to provide the information to be displayed and reported by the instant invention, sensors and information is taken from the following locations. Engine RPM 11 is provided by electronic tachometer 29 on gasoline engines, and a mechanical source on diesel engines. Engine temperature display 12 is provided by a sensitive thermocouple 30 located at, or near, the coolant return to the car radiator. The output of thermocouple 30, as well as the outputs of the other sensors, is fed through primary display and annunciator generator 34 (microcomputer or microprocessor) which controls the segments of the liquid crystals and provides measurement values to horsepower computer 35 and sensing computer 36. A microcomputer which may be used in the preferred embodiment is of the type generally designated 8050 or equivalent manufactured by Intel or National Semiconductor.

Outside air temperature 13 is taken from a source such as a temperature sensor 31 outside the vehicle where actual ambient temperatures may be obtained. Engine torque 14 is taken from the engine torque sensor 32 in the area of the torque converter in automatic transmissions. On both automatic and manual transmissions the engine's torque conveyed initially to the transmission can be measured.

Figure 12:
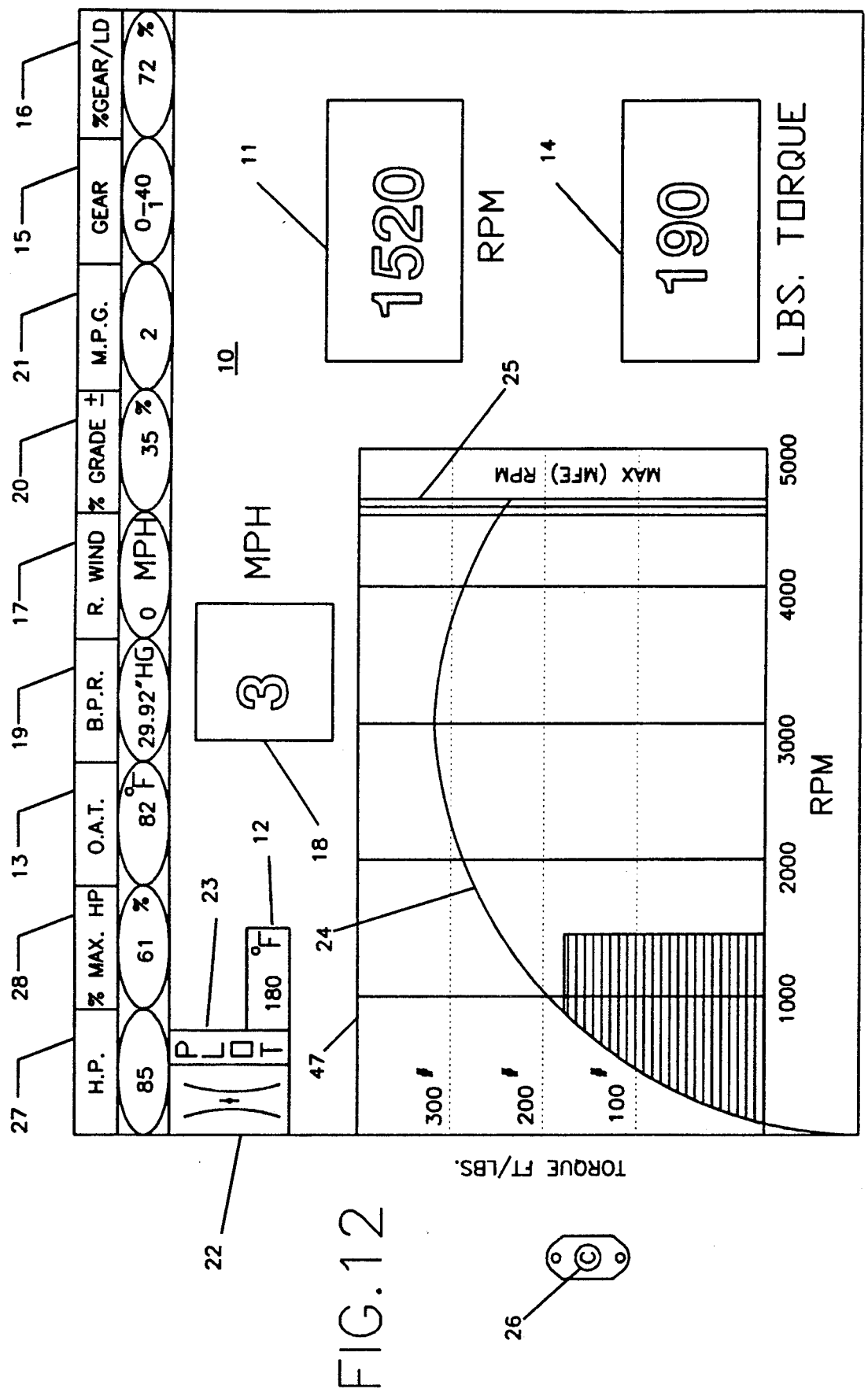
Figure 16:
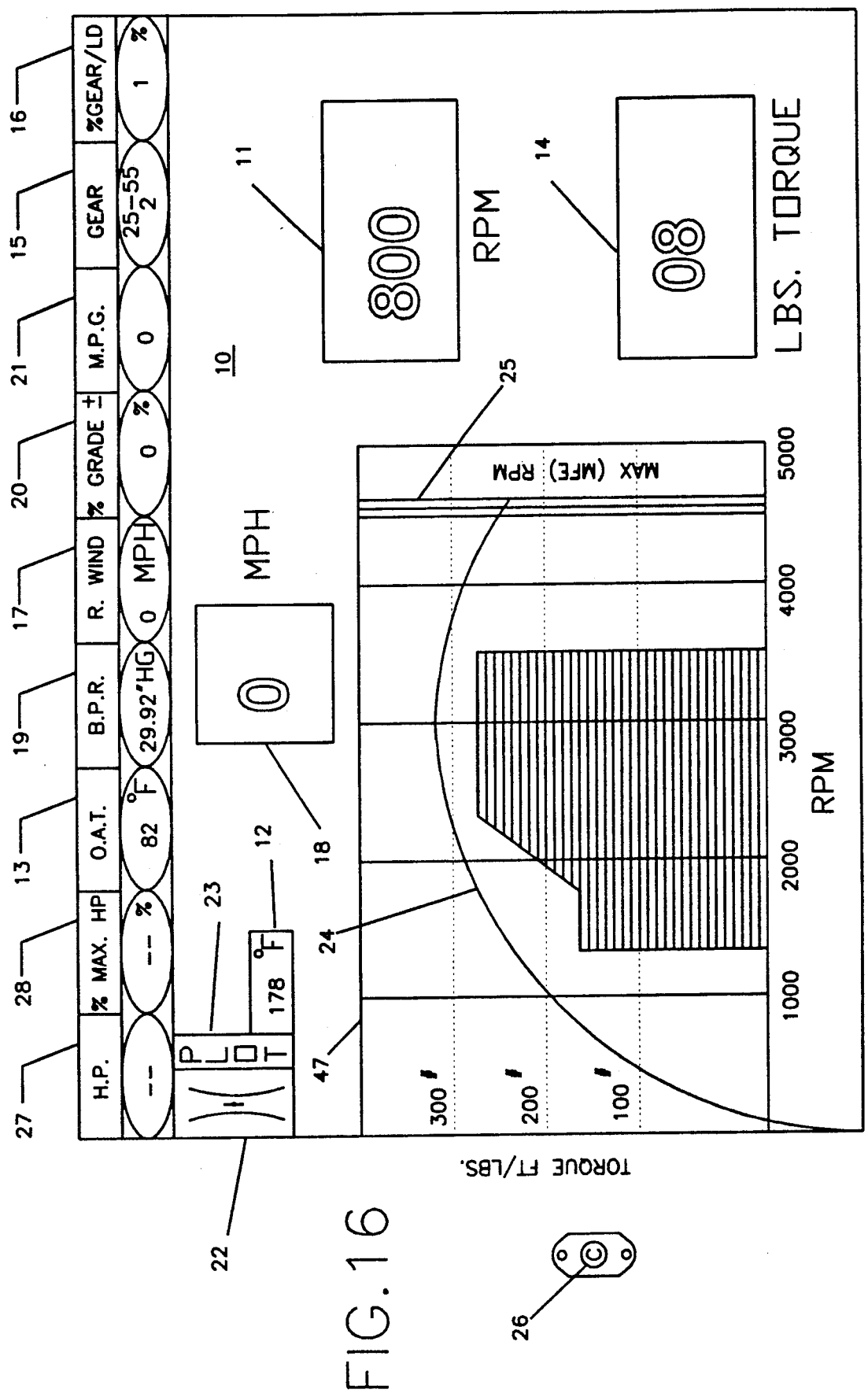

Although initially intended to show those forward gears which are suitable for torque plotting, the shift indicator sensor 33 provides input for the gear selected display 15 and can include all gear positions for the particular vehicle. Those forward gears deemed suitable by the vehicle manufacturer for torque plotting shall indicate by also displaying the mph range for the particular gear selected as applicable to torque plotting as shown in FIGS. 12 and 16 in display 15. The displayed range in mph should, under most conditions, impose a suitable engine/transmission load (under full throttle) to activate torque plotting, while not exceeding maximum (max) safe speeds (assumed max of 55 mph or determined by vehicle manufacturer) and will avoid the problem of automatic transmissions automatically down shifting under full throttle.

When a forward gear is selected for torque plotting, such as 2nd gear, which will permit the vehicle to reach the manufacturer established (MFE) maximum safe MPH prior to reaching the maximum rated engine rpm, a new max rpm is graphed by a red dashed line 25. The operator is then aware that the engine may be operating properly, yet upon reaching the maximum safe mph, torque plotting was discontinued at a corresponding rpm. For the driver to obtain torque plotting at higher rpms, the vehicle must be slowed or stopped and the next lower gear selected. Manufacturers could avoid the above, by limiting torque plotting to first gear or a forward gear which would enable the engine to reach its maximum rpm at or below 55 mph. When a manufacturer elects to permit torque plotting to occur in a gear which will permit the vehicle to reach 55 mph or max mfe safe speed at less than rated engine rpm, it may wish to display a new rpm red line corresponding to 55 mph for the gear selected by means of a dashed line as shown in the example shown in FIG. 16.

In order for the engine's torque to be measured, the engine must be under load. The engine's load varies upon which forward (and /or reverse) gear is selected and upon the gear range. To measure the load on the engine, the output torque of the transmission is sensed by transmission torque sensor 37 and the load is computed by sensing computer 36 according to the gear in use to check if the engine is sufficiently burdened to take a measurement of its maximum torque capabilities.

To understand how the environment influences the performance of a vehicle and how the vehicle reacts to the environment, an aircraft type pitot tube 38 is located in the undisturbed air of the front of the vehicle. Connected to a highly sensitive indicator, the relative speed of the wind is digitally displayed by relative wind display 17. An optional consideration would be to convert the relative wind to headwind after the generator 34 takes into consideration the vehicle's mph.

A speedometer 39 provides digitally displayed miles per hour on display 18 and the information necessary to convert the output of fuel flow sensor to miles per gallon on display 21.

Atmospheric pressure directly affects the breath that each engine takes and the power it produces. Barometer sensor 41 senses the barometric pressure surrounding the vehicle and provides an input to display 19. In some instances of low atmospheric pressure and/or low boost pressure for turbocharged or supercharged models, i.e., high elevations and mountainous regions as well as extreme weather conditions, a vehicle's engine may be functioning properly yet fail to produce its rated torque. In cases of low atmospheric pressures, torque plotting will be disabled and an indicator across the barometric pressure display 19 will inform the driver accordingly.

Inclinometer 42 provides input to % grade display 20 to provide an indication of the effect of the road grade on the performance of a vehicle. In some instances of downhill travel, engine and transmission loads will be too light to produce torque plotting. All drivers would like to know how their vehicles handle climbing a grade with or without a trailer. This includes pulling a boat on a trailer up a ramp. A push button design (not shown) will enable the driver to set the reference for vehicle attitude on level terrain according to different loads upon the vehicle so as to result in a true measurement of the grade under all vehicle load conditions. Such grades may be expressed in % or degrees.

Fuel flow, of vital concern to the driver and to the economy, indicated by miles per gallon display 21, is provided by fuel flow sensor 40 signal combined with speedometer 39 and computed in generator 34. One of the primary indications of improper engine operation is less than optimum fuel economy. Furthermore, fuel economy (miles per gallon) quickly enables operators to select instantly the best speed/gear for a particular task, i.e., cruising a highway while pulling a trailer, climbing a grade, etc. Other uses of fuel flow and miles per gallon may be made by the vehicle operators including the choice of the best fuels for optimum miles per gallon under any specific load condition and weather.

Figure 14:
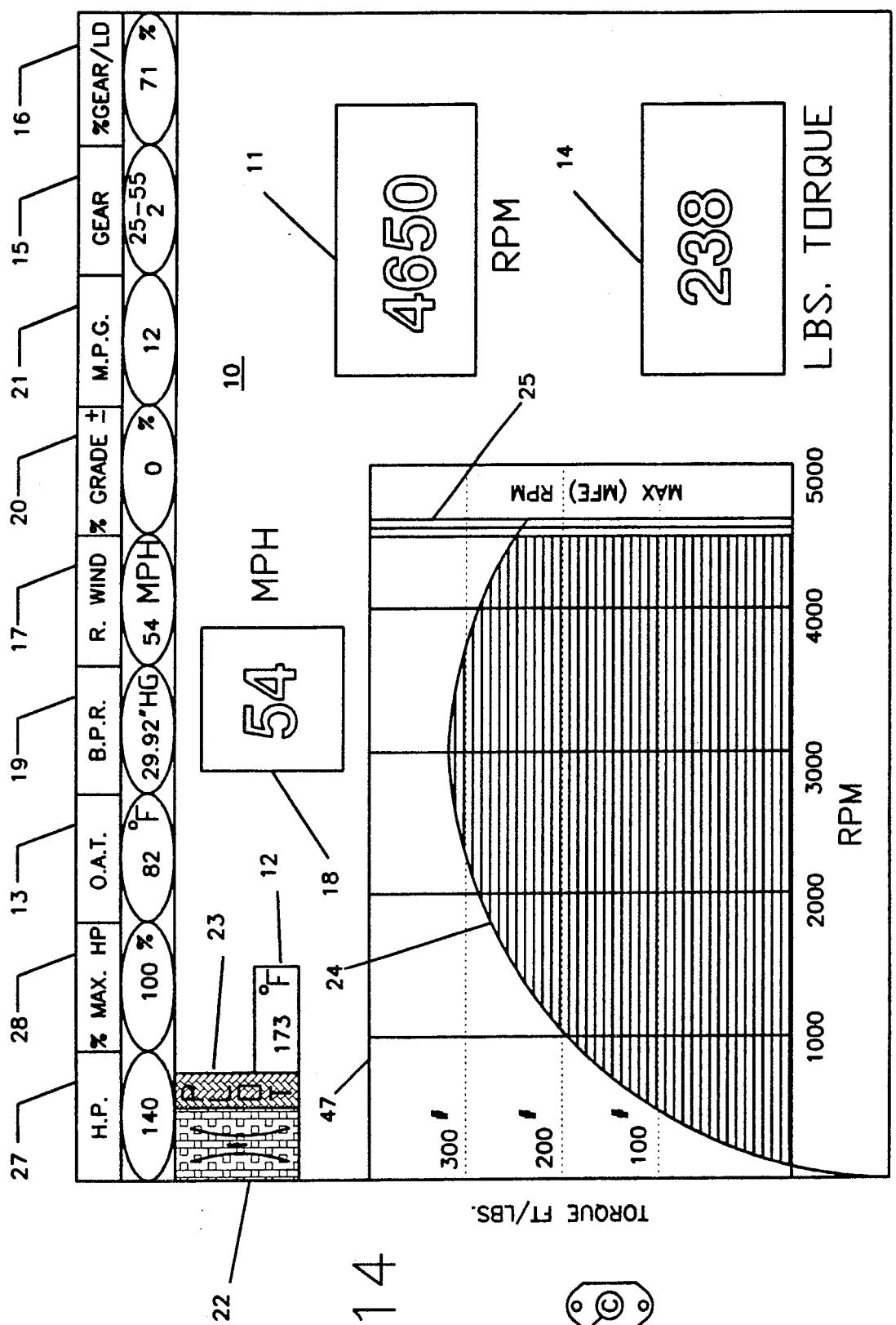

A full throttle switch 44 mounted on the vehicle's throttle body (or injector pump if diesel) activates the torque plotting circuitry in sensing computer 36 when the throttle is fully opened (and providing other criteria are met). Plot display 23 illuminates to indicate torque plotting may be possible and when the throttle has reached its wide open position, display 22 illuminates with a graphic depiction of the wide open status of the throttle. The example in FIG. 14 shows wide open throttle display 22 as being yellow and plot display 23 as being orange.

Manufacturer established torque is displayed graphically in FIGS. 3 through 17 in a blue color line 24 although other colors are acceptable. Torque is displayed graphically by torque analog display 45 which receives inputs from graphic display computer generator 46. Once the throttle has reached its wide open position as detected by full throttle switch 44, other criteria provided by the sensors, i.e., barometric pressure, engine temperature, outside air temperature, torque plotting gear selected, sufficient gear load, engine below safe MFE speed assumed 55 mph, etc. are checked and processed within the display generators 34 and 46 and the computers 35 and 36. When the above conditions are satisfied, the torque plotting annunciator display 23 is illuminated until any one of the criteria is no longer within tolerance.

Torque is displayed graphically at all times except when the vehicle is at idle and/or under "no load" sufficient to measure the engine's torque. The manufacturer's maximum intended torque is defined ideally by a blue line 24 and is conservatively set so it is "fleet" attainable, probably representing 97%, for example, of an engine's maximum torque output. In graph depictions, plotting of torque may occur beyond the manufacturer's maximum displayed boundary line. Torque limits are defined on the graph by maximum upward boundaries of the display. Torque is also computed and displayed digitally alongside RPM.

Figure 17:
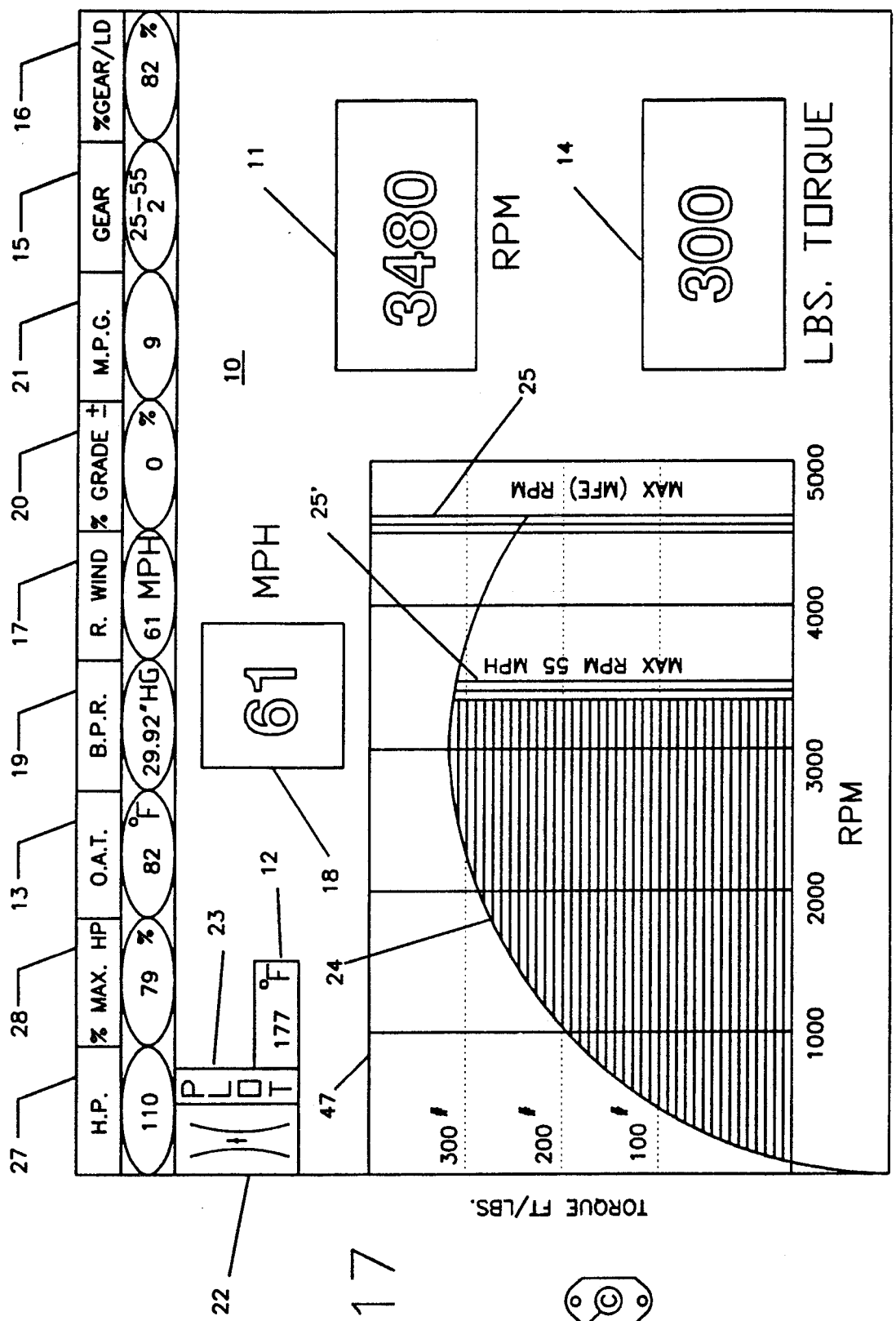

RPM is defined on the graph display screen 47 as the maximum boundary of the display to the right. In addition, RPM is displayed digitally alongside the digital torque display. A red line 25 defines the manufacturer's maximum intended RPM. As shown in FIG. 17, a manufacturer may choose to show the maximum rpm at which torque plotting will occur upon the vehicle reaching 55 mph, by means of a computer 46 generated vertical red dashed line set according to the forward gear selected A push button, "momentary", switch 26 clears the display screen 47 after torque plotting has occurred-otherwise the screen will remain frozen. At all times all other displays are "live", including digitally displayed torque and RPM (unless the manufacturer so elects to have certain other displays "frozen" as a part of the torque plotting feature). Horsepower computer 35 uses torque and RPM to compute actual horsepower being used, which is displayed on horsepower display 27. As another optional feature, computed horsepower from torque and RPM may be expressed digitally in % of total manufacturer rated horsepower and shown in % MAX HP display 28.

The above described graphic depictions are for illustrative purposes only, and do not represent the operation and performance parameters of a particular vehicle. The display presentation is subject to refinement and/or rearrangement. Colorization and other items of presentation are assumed to remain subject to the manufacturer's choices.

Although the vehicle monitoring system is intended as a graphic presentation and recordation of torque and horsepower, other parameters are included to make the device capable of reporting all important factors contributing to a vehicle's performance. Certain manufacturers may choose to make some of the reported information optional. In addition, auto makers may choose to fine tune the vehicle monitoring system to particular vehicles in a variety of ways, including but not limited to: confining torque plotting to one particular forward gear, using the on board computer's capability of enhancing torque plotting and reporting where certain transmission torque loads require, choosing a slightly less than full-throttle position for the torque recording full throttle switch 44 to be activated to reduce automatic transmission automatic down shifts.

THEORY OF OPERATION

All information is reported "live" and updated by the on-board computer in manufacturer established intervals, presumably ½ second. When the vehicle's accelerator (throttle) is fully opened (or near fully opened as MFE), a switch 44 is engaged, and if other necessary conditions are met, the torque corresponding to the RPM is plotted and remains graphically presented on the screen 47 until cleared. Torque displaying occurs at all times (live). However, when the vehicle's accelerator (throttle) is fully opened (or near fully opened as MFE) a switch 44 is engaged, and if the following conditions are met, torque plotting occurs:

(a) Outside air temperature is within acceptable limits, below maximum as MFE.

(b) Barometric pressure is at or above MFE minimum's.

(c) Engine has reached MFE operating temperature.

(d) Vehicle is engaged in one of the MFE forward gears, most likely 1st and 2nd gears.

(e) The engine is under sufficient load as determined by MFE transmission torque output corresponding to MFE gear selected.

(f) The vehicle is moving at or below MFE maximum safe speed (assumed 55 mph).

Torque is plotted (electronically displayed and retained) as RPM's are increased under the above conditions. The display is retained until "push to clear" switch 26 is depressed. Upon depressing switch 26 the graph display returns to live indications of torque and RPM.

In addition, a wealth of information is also displayed digitally to the vehicle's operator:

(a) The actual horsepower being used to propel the vehicle.

(b) Percent of available horsepower being required by the vehicle's engine at that moment.

(c) Outside air temperature, and when the outside air temperature exceeds MFE maximum levels, torque plotting is disabled and an indicator "flag" appears on the outside air temperature display 13.

(d) Barometric pressure, or if the manufacturer prefers, on turbo charged models, to display intake manifold pressure. Also, a "flag" appears over the display when pressures are below MFE minimum levels and torque plotting is disabled.

(e) Head wind and relative head wind are sensed by an aircraf-type pitot tube 38.

(f) The on-board computer uses existing technology in sensing fuel flow and miles per gallon.

(g) The vehicle's gear shift position is selected and the gears unsuitable for torque plotting will be indicated on the display in the gear display window 15.

(h) The on-board computer recognizes all forward gears and judges for the forward gear selected the MFE transmission torque output capabilities and displays such as a percent of total possible load. If the transmission torque output load is insufficient to permit a measurement of the vehicle's engine's maximum intended torque output, such is so noted by a "flag" in the display.

(i) A simple inclinometer 42 (which may be set on level ground by the driver to compensate for particular vehicle loading and attitude) will indicate whether the vehicle is traveling uphill or downhill and enable the operator to tell the power requirements associated with climbing grades with the vehicle under all actual load conditions and/or towing a trailer.

The invention comprises a unique graphic display (graph display screen 47) simultaneously presenting torque, RPM, and manufacturer established paramaters (MFE). The display 47 consists of digitally generated luminous screen of which the vertical ascension of the illumination represents maximum levels of torque output and the horizontal boundary (right most) represents maximum RPM output. Superimposed upon this screen is the manufacturer's "envelope" (MFE) of maximum torque curve as established by the manufacturer of the vehicle/engine—a blue line was chosen to depict this maximum design rated torque curve and a red line to represent the maximum RPM design rated. There are also provisions for electronically reindexing the maximum design rated RPM "red line" to correspond to the vehicle reaching maximum safe MPH as determined by the vehicle's manufacturer (for example 55 MPH). This is a direct effort to eliminate a potential hazard or "attractive nuisance" inducement which could encourage a driver to exceed any speed (MPH) regarded as unsafe by the manufacturer.

In further efforts to promote safer usage of the graphic reporting and displaying of the vehicle's engine's live maximum torque output, there are provisions for the display screen to electronically record "freeze" and hold its display when all certain conditions are met which would enable the vehicle's engine to produce its own maximum levels of torque output. This enables a later analysis and comparison to the maximum torque output (blue line) intended by the vehicle/engine's manufacturer, to be performed by the driver or passenger when the vehicle is not in hazardous traffic conditions or has been brought to a stop, e.g., in safety.

While torque and horsepower testing equipment may be available in laboratories or shops, the only true indication of torque and horsepower may only be obtained on the road under actual conditions. As opposed to adding parameters to a group of monitoring instruments, as shown by the prior art, the invention occurred in the opposite process and was carried through to produce its maximum potential utility in being the most complete device for measuring the actual "live" performance of a vehicle's performance. First, it displays the vehicle's engine's maximum design intended torque output (MFE) (live) as well as and in comparison to the actual torque output. Measuring the simple torque produced by the vehicle's engine is a novel step, however, in this case, displaying and reporting an engine's ability to generate the levels of torque intended by the manufacturer (MFE) of the vehicle and engine depends upon that vehicle's engine being under maximum or near maximum load. Therefore, two torque measurements are required: the engine's live torque output, and the load the engine is carrying through the transmission. Such a load (maximum or minimum) may depend and be in consideration (measured in consideration and computed in consideration) of more than one forward gear.

EXAMPLES OF OPERATION

Example # 1

Figure 3:
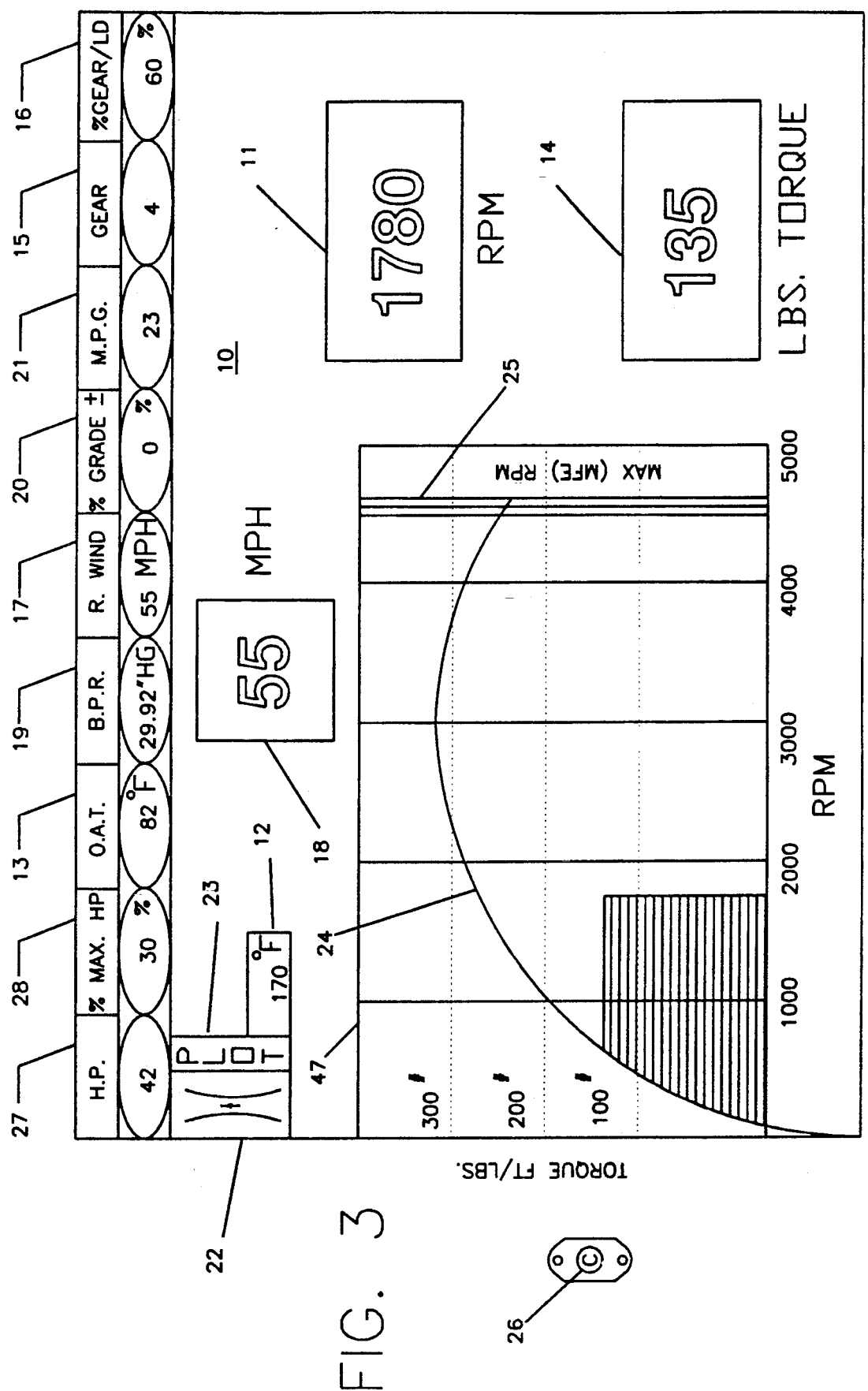
FIGS. 3 through 17 are examples of the visual display under different operating conditions of the vehicle.

FIG. 3 shows an example of a vehicle traveling at 55 mph on a level highway under no wind conditions. Owners would be advised to become familiar with these parameters of operation at 55 mph on level ground in no wind conditions, noting the miles per hour and engine operating temperature in particular, so that they can use this display as a benchmark indicator of their vehicle's engine's performance deterioration as first indicated by a drop in miles per gallon.

Example # 2

Figure 4:
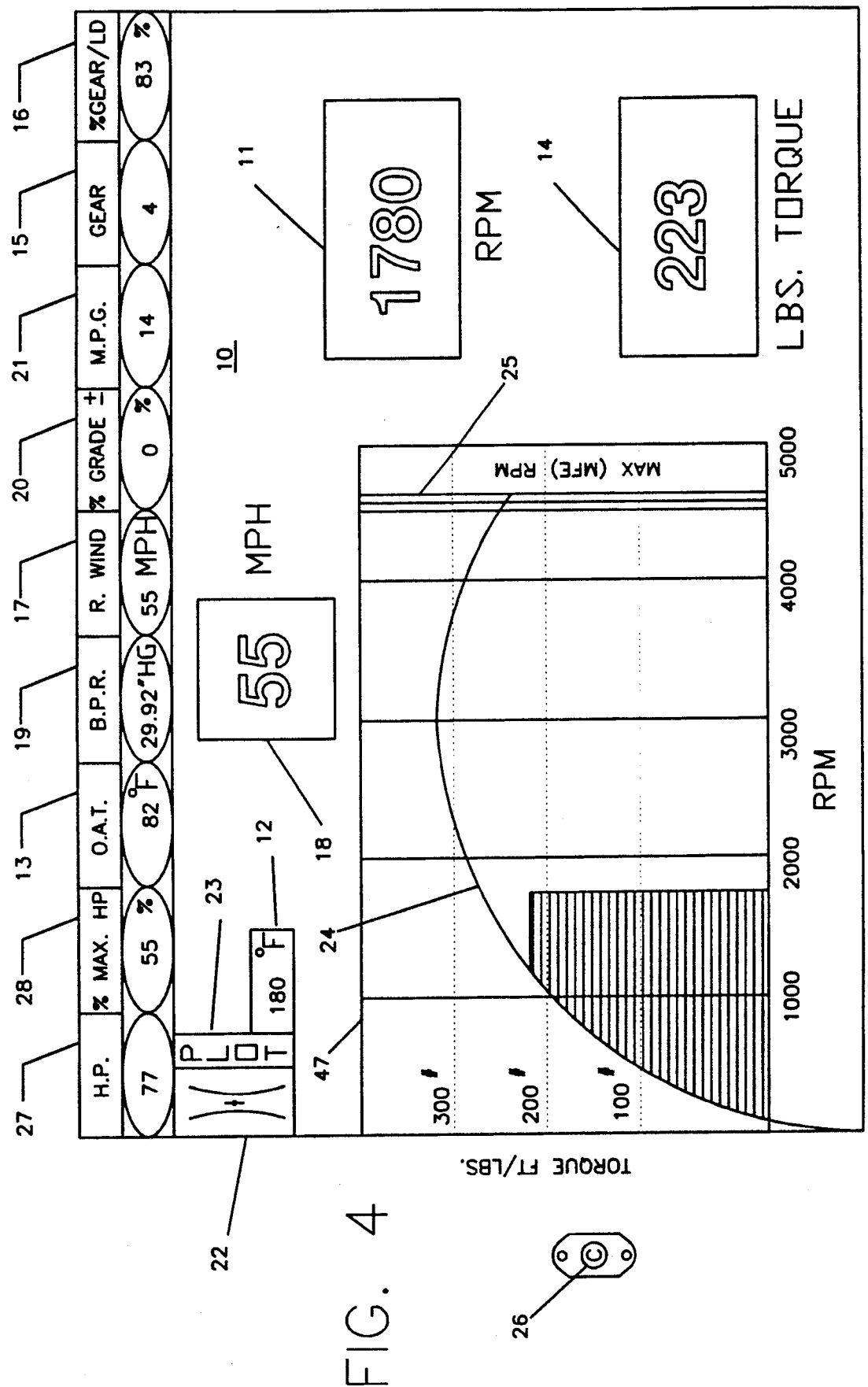

FIG. 4 shows an example of a vehicle traveling at 55 mph towing a trailer under no wind conditions. (Compare to Example #1).

Example # 3

Figure 5:
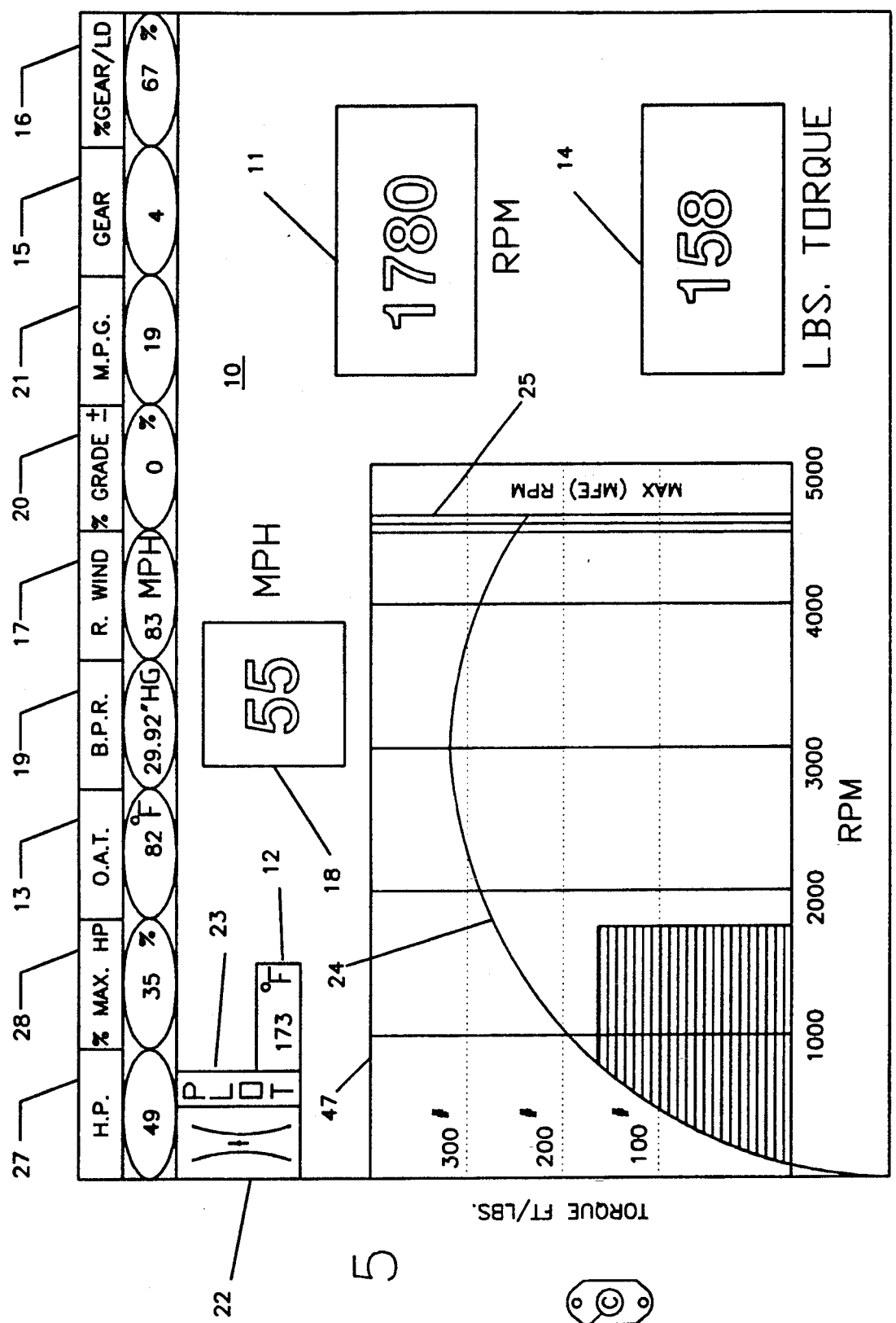
Figure 5:
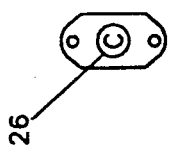

FIG. 5 shows an example of a vehicle traveling at 55 mph driving into a head wind of 28 mph. (Compare to Example # 1).

Example # 4

Figure 6:
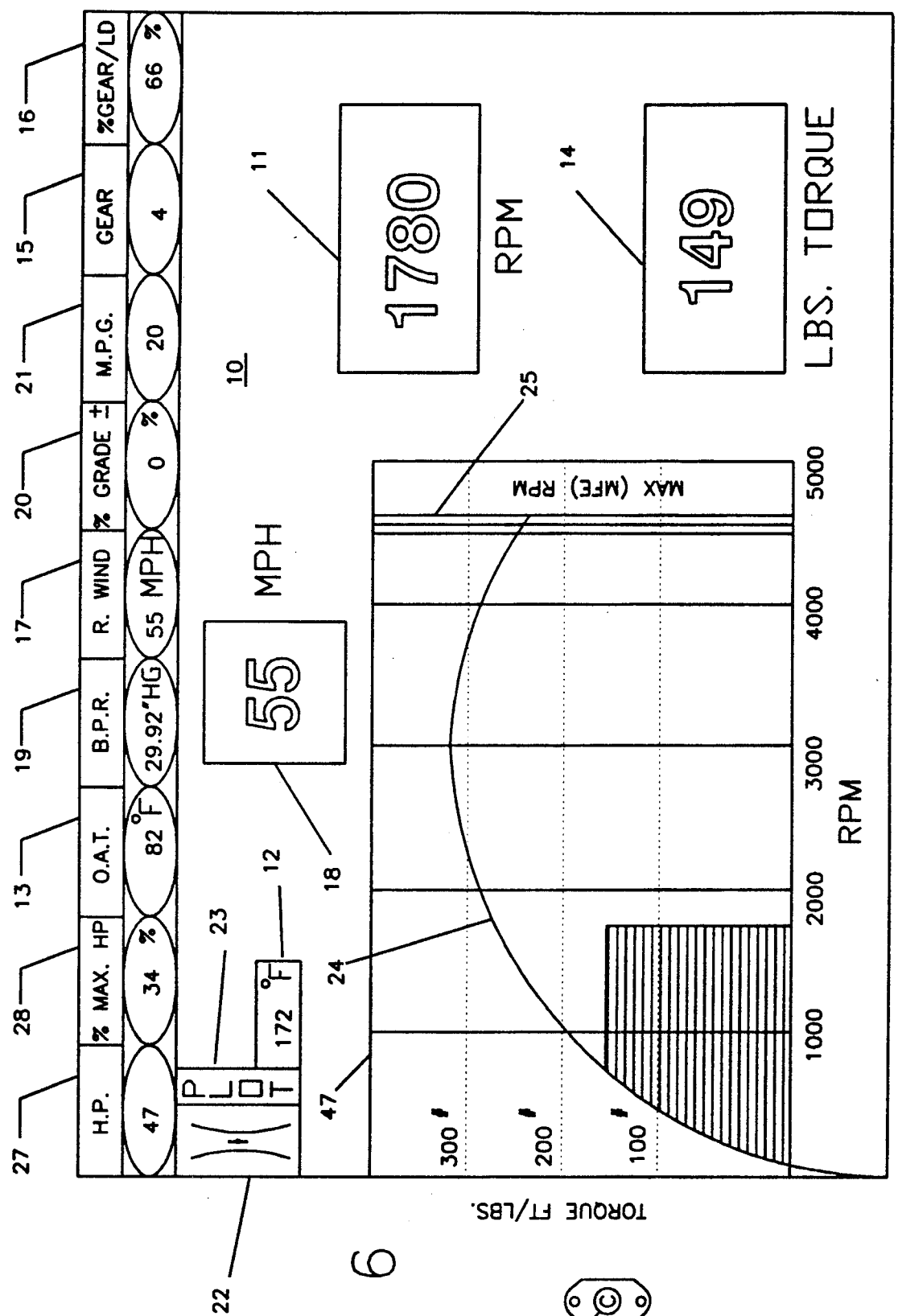
Figure 6:
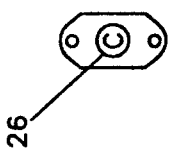

FIG. 6 shows an example of a vehicle traveling at 55 mph in no-wind conditions on under-inflated tires. (Compare to Example # 1).

Example # 5

Figure 7:
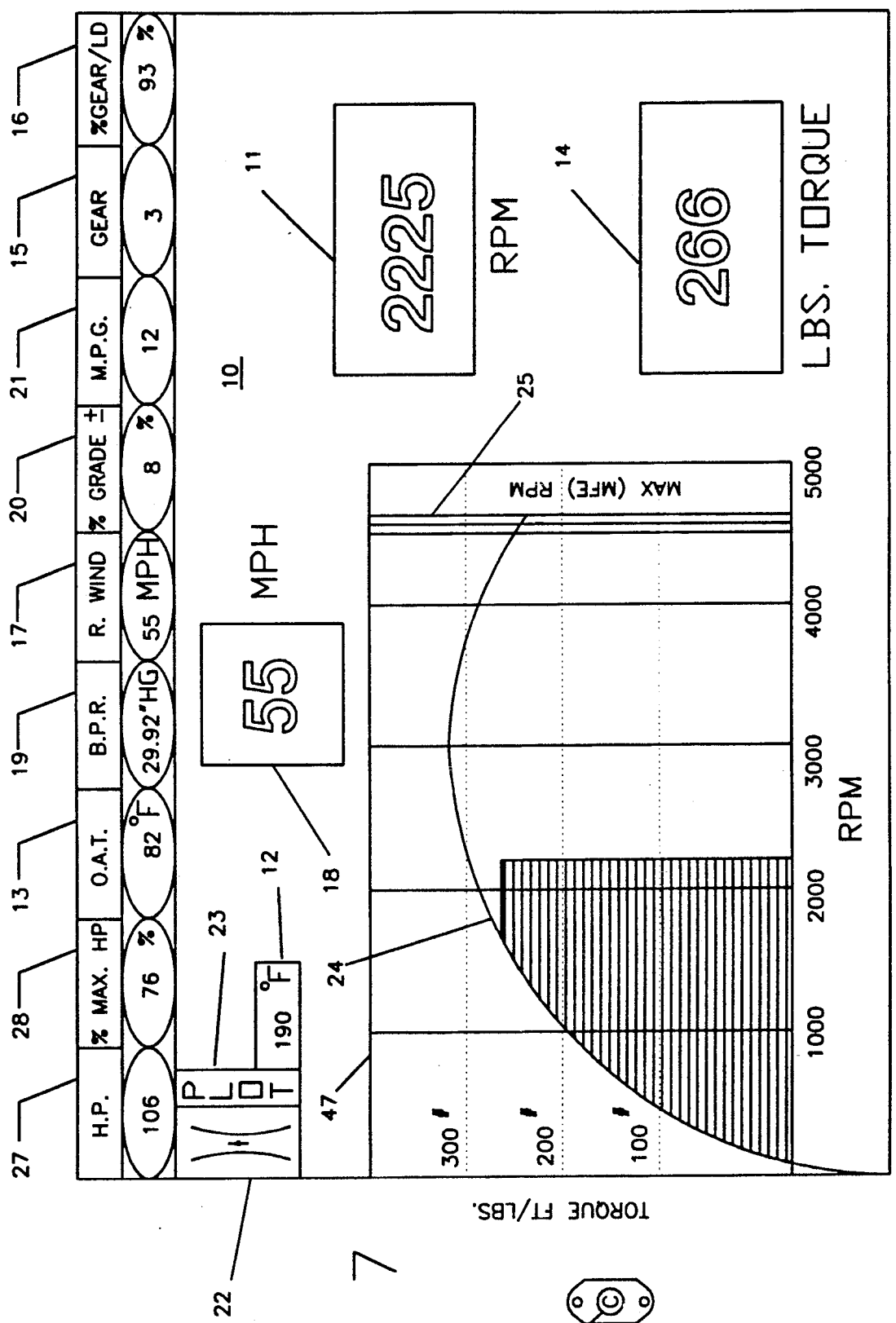
Figure 7:
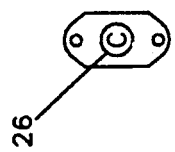

FIG. 7 shows an example of a vehicle traveling at 55 mph up a grade. (Compare to Example # 1).

Example # 6

Figure 8:
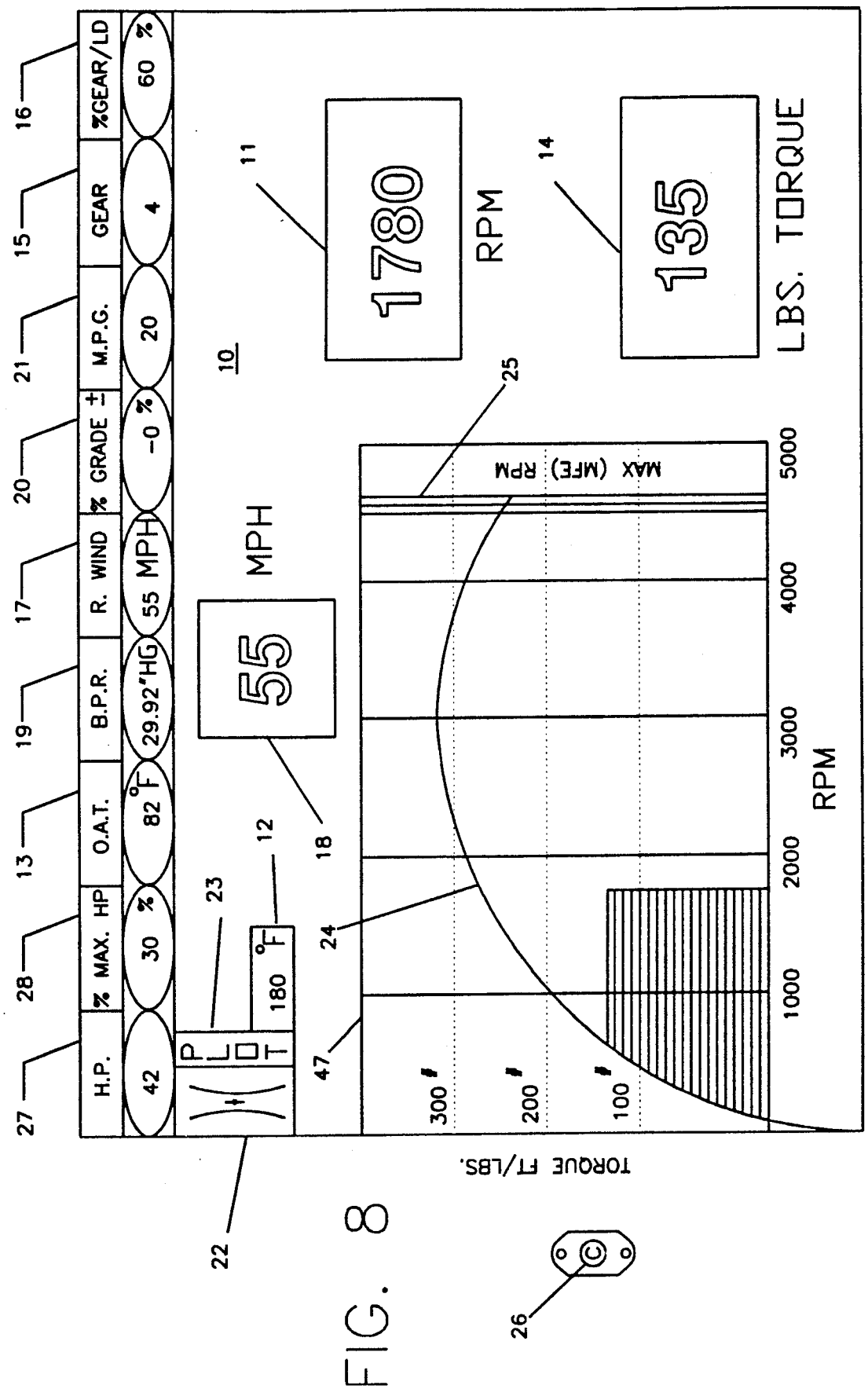

FIG. 8 shows an example of a vehicle traveling at 55 mph on inferior fuel. (Compare to Example # 1). Note. Eng. Temp.

Example # 7

Figure 9:
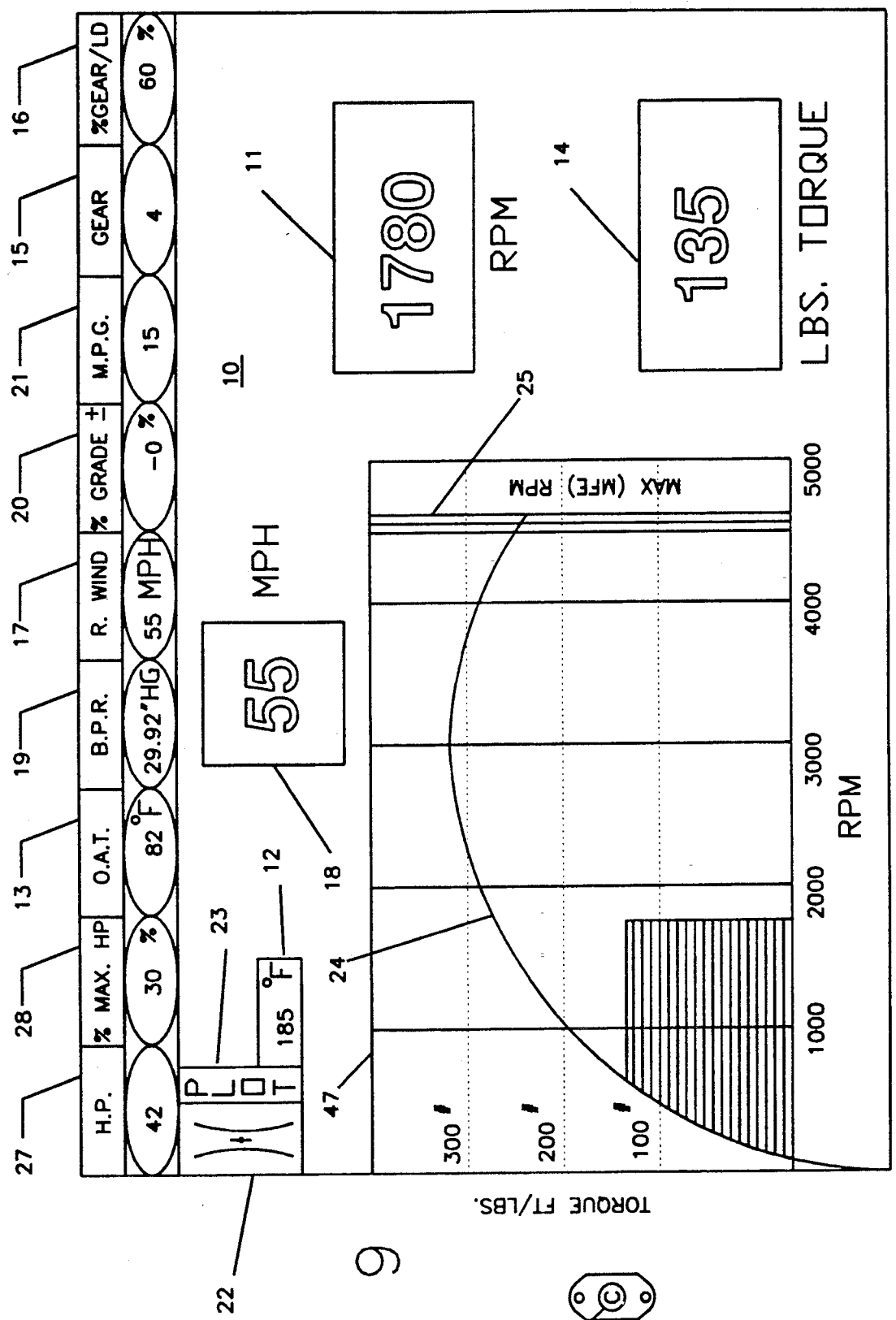
Figure 9:
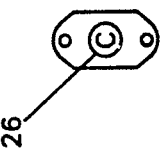

FIG. 9 shows an example of a vehicle traveling at 55 mph on a level highway in no-wind conditions. Display indicates that the engine needs a tune-up or overhaul. See MPH and engine temperature.

Example # 8

Figure 10:
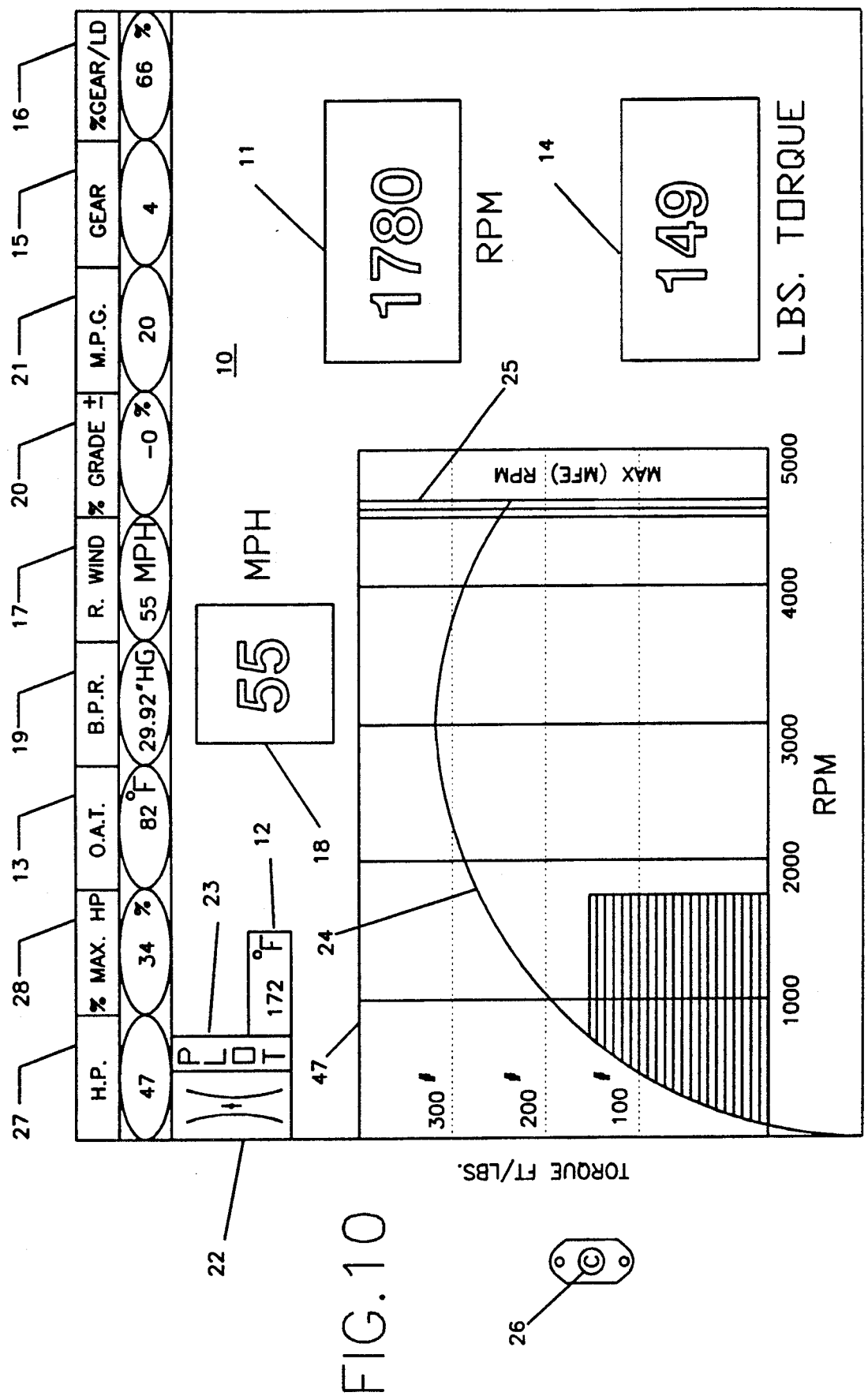

FIG. 10 shows a vehicle traveling at 55 MPH on a level highway in no-wind conditions with indicators which cause the operator to suspect a malfunction, i.e., such as dragging brakes, vinyl roof separation causing drag, or something caught under car or snagged on car producing extra drag.

Example # 9

Figure 11:
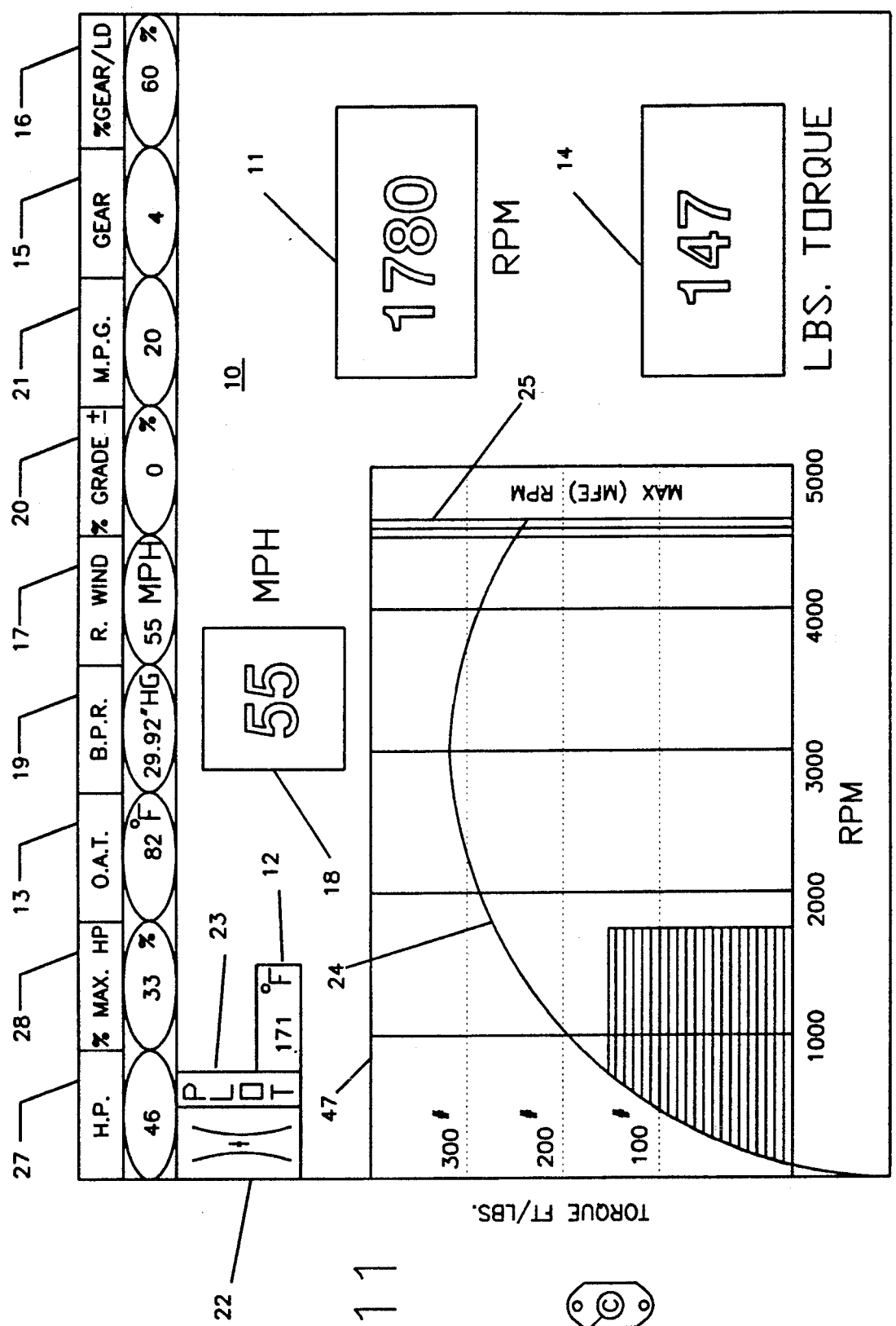
Figure 11:
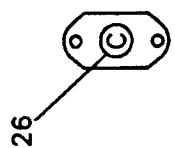

FIG. 11 shows a vehicle traveling at 55 MPH on a level highway in no-wind conditions with indicators which cause the operator to suspect a malfunction (under the hood), i.e., air conditioner compressor locked up producing drag, obstruction in fan/belts or malfunctioning other accessories components.

Example # 10

FIG. 12 shows a vehicle towing a boat on a trailer up a boat ramp.

Example # 11

Figure 13:
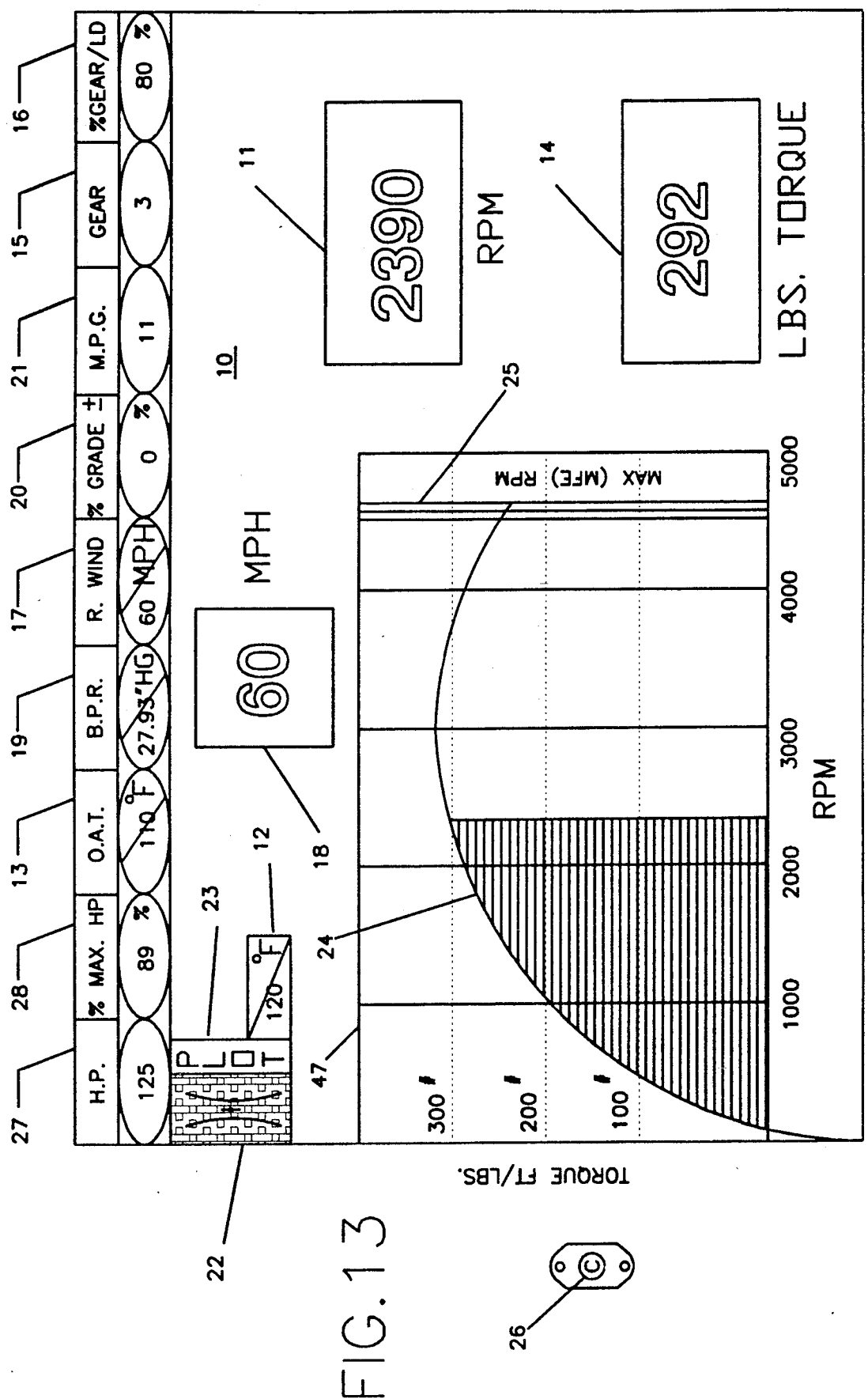

FIG. 13 shows that the driver has applied full throttle, however, other flagged (crossed out) conditions are not within the parameters of torque plotting, i.e., outside air temperature, barometric pressure, vehicle speed and temperature. In this case, the driver has applied full throttle while traveling at 60 MPH. The manufacturer has chosen to disallow torque plotting at speeds above 55 MPH to avoid encouraging speeding, so screen display remains "live".

Example # 12

FIG. 14 shows a driver who has applied full throttle and all conditions have been met for torque plotting, i.e., O.A.T., B.P., Gear and Gear Load, and engine at operating temperature. The car is accelerated at full throttle and torque plotting occurs until either driver releases full throttle or vehicle reaches MAX MFE safe speed (assumed 55 MPH). All indicators shown at reaching 54 MPH under full throttle. Gear display 15, in conjunction with each suitable forward gear selected for torque plotting, shows the mph range which imposes a suitable engine/transmission load, will not exceed a safe speed and will avoid automatic transmission automatically down shifting under full throttle.

Example # 13

Figure 15:
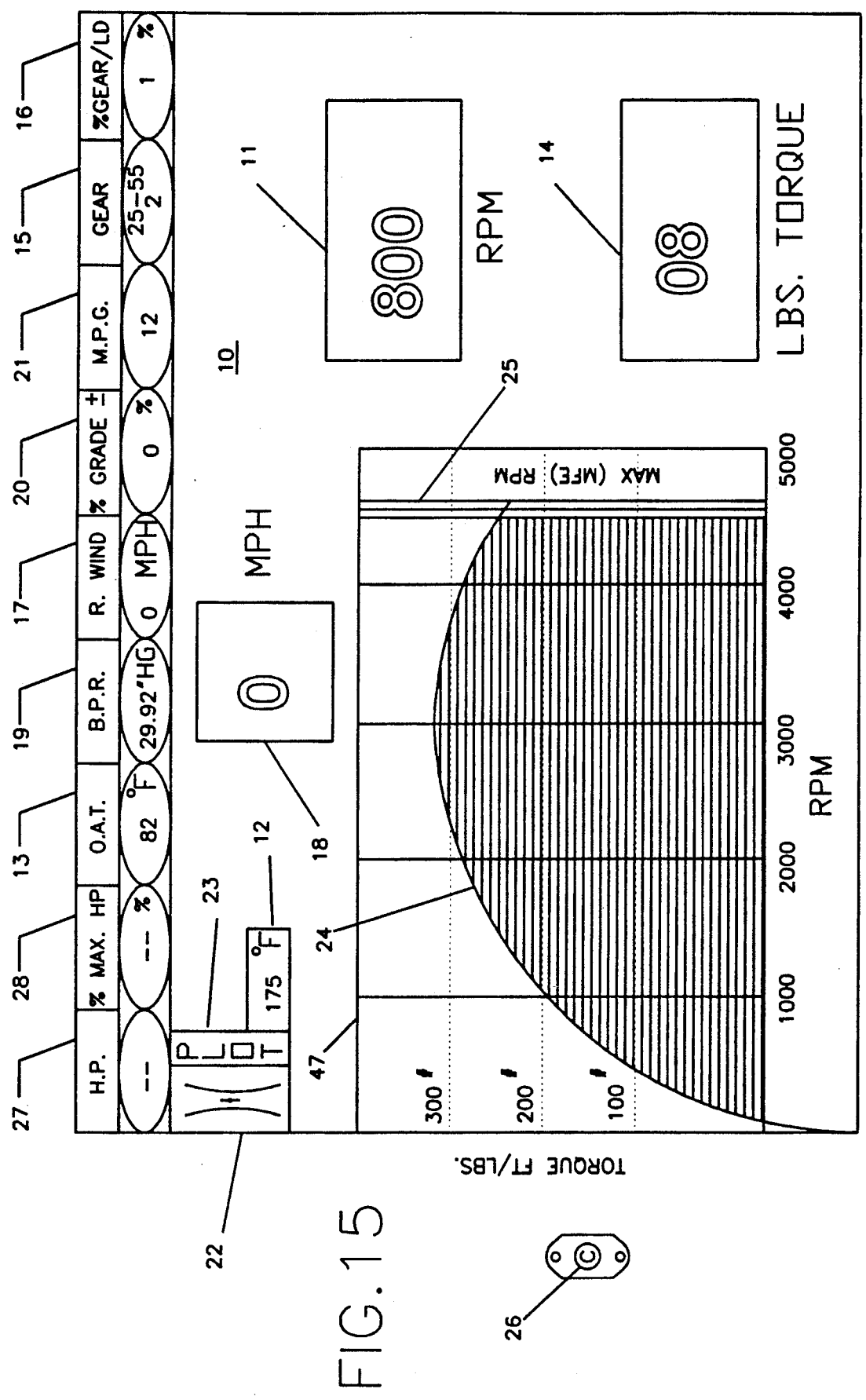

FIG. 15 shows that the driver has applied full throttle and all conditions were met for torque plotting has occurred. The vehicle has now been brought to a stop and is still in 2nd gear at idle. Display 47 has not been cleared and retains the torque plotting information.

Example # 14

FIG. 16 shows that the driver has applied full throttle and all conditions were met for torque plotting and torque plotting has occurred. Vehicle has now been brought to a stop and is still in 2nd gear. The display 47 has not been cleared and retains the plotted torque information indicating that the engine is not producing rated torque/power. Until the engine reached 1300 RPM it produced insufficient torque/transmission load to trigger torque plotting. The engine also failed to reach rated RPM. At idle, H.P. and % MAX HP are blank.

Example # 15

FIG. 17 shows that the driver has applied full throttle and all conditions have been met for torque plotting, however, because of the speed range of 2nd gear, the vehicle is now traveling at 61 MPH and still accelerating. Torque plotting however, was discontinued at less than the maximum engine RPM when the vehicle reached 55 MPH, of which the driver was informed by the dashed red "artificial" RPM line and the MAX range of MPH in the gear selected window 15.

While the invention has been explained with respect to a preferred embodiment thereof, it is contemplated that various changes may be made in the invention without departing from the spirit and scope thereof.

What is claimed is:

1. An on-board, dash mounted, vehicle monitoring system for real-time monitoring of a plurality of functions and conditions effecting a vehicle's performance and providing a graphic presentation and recordation of torque, RPM, and horsepower, and reporting transmission torque, inclination, headwind, barometric pressure, and ambient temperature effecting a vehicle's performance, said vehicle including a plurality of internal and external sensor means for producing sensor signals corresponding to said plurality of functions and conditions, said monitoring system comprising:

processing means responsive to said sensor signals for producing display signals corresponding to said functions and conditions, converting said functions and conditions to torque and horsepower, controlling digital and graphic displays, and concurrently producing and displaying signals corresponding to manufacturer established design upper limits comprising, maximum intended torque, maximum intended RPM, and percentage of horsepower being used, digital display means mounted in said dashboard for presenting a first group of functions and conditions effecting a vehicle's performance, and the percentage of horsepower being used, graphic display means mounted in said dashboard for presenting and recording concurrently, a second group comprising torque output, revolutions per minute, system status, horsepower effecting said vehicle's performance, and manufacturer established design upper limits, comprising, maximum intended torque, maximum intended RPM and percentage of horsepower being used, throttle open switch means for activating said processing means to provide vehicle and horsepower plotting sensor signals to selected graphic display means when torque plotting conditions are met, and switch means for clearing said graphic display means after torque, horsepower, and manufacturer established design upper limits, comprising maximum intended torque, maximum intended RPM, and percentage of horsepower used, plotting has occurred.

2. A monitoring system according to claim 1, wherein manufacturer established design upper limits for torque are defined by the upward boundary of said graphic display, manufacturer established design upper limits for revolutions per minute are defined as the maximum right boundary of the graphic display, a red line defines the maximum manufacturer established design upper limits for intended RPM, and a blue line defines manufacturer established design upper limits for maximum intended torque.

* * * * *